United States Patent [19]

Ferrare

[11] Patent Number: 4,753,445
[45] Date of Patent: Jun. 28, 1988

[54] ADJUSTABLE CYLINDER TRANSPORT CART

[75] Inventor: Gino D. Ferrare, El Segundo, Calif.

[73] Assignee: Anthony Welded Products, Inc., El Segundo, Calif.

[21] Appl. No.: 29,337

[22] Filed: Mar. 23, 1987

[51] Int. Cl.⁴ .............................................. B62B 1/06
[52] U.S. Cl. ......................... 280/47.13 R; 280/47.17; 414/444
[58] Field of Search ............ 280/47.13 R, 43.2, 43.24, 280/47.19; 414/458, 786, 457

[56] References Cited

U.S. PATENT DOCUMENTS

| | | | |
|---|---|---|---|
| 3,064,990 | 11/1962 | Salvucci | 280/42.2 |
| 3,865,392 | 2/1975 | Hartway | 280/47.13 R |
| 4,205,937 | 6/1980 | Fawley et al. | 280/47.2 |
| 4,340,132 | 7/1982 | Cerna | 280/47.13 R |

OTHER PUBLICATIONS

Catalog M-600 Entitled: Anthony Medical Products 1983.

Primary Examiner—Richard A. Bertsch
Attorney, Agent, or Firm—Kelly, Bauersfeld & Lowry

[57] ABSTRACT

A cart for transporting pressurized cylinders includes an adjustable body supported above a ground surface by a pair of wheels, and a pair of cylinder retaining bands affixed to the body for holding a pressurized cylinder. The body is vertically oriented and includes a lower tube portion and an upper arm portion partially situated within and slidable with respect to the tube portion. This tube portion includes an open channel defined by two spaced-apart parallel edges extending substantially the length of the tube portion. A shaft is affixed to a lower end of the arm portion and extends perpendicular to the longitudinal axis of the body and outwardly through the channel. The shaft is exteriorly threaded, and engages a nut which can be rotated to frictionally bear upon the tube portion. This has the effect of holding the arm portion and the tube portion in a fixed spacial relationship.

11 Claims, 1 Drawing Sheet

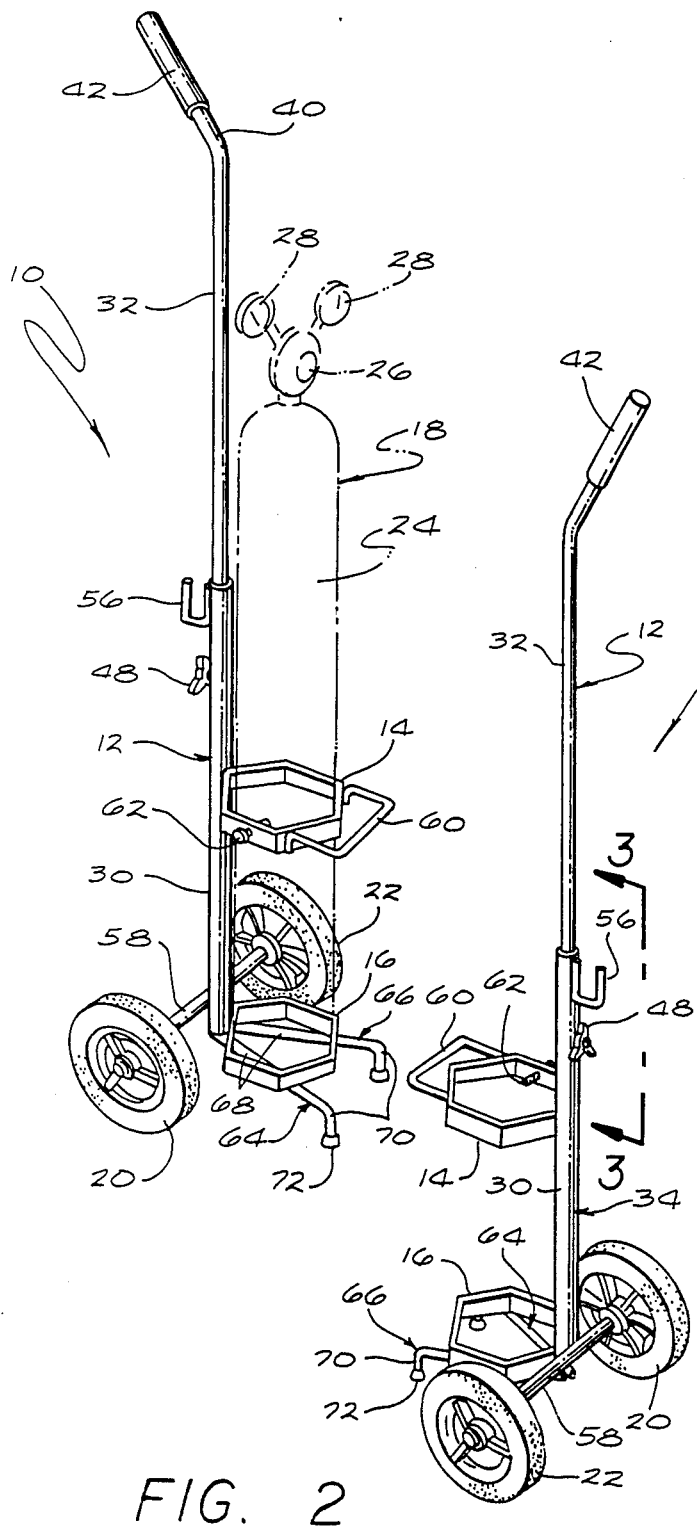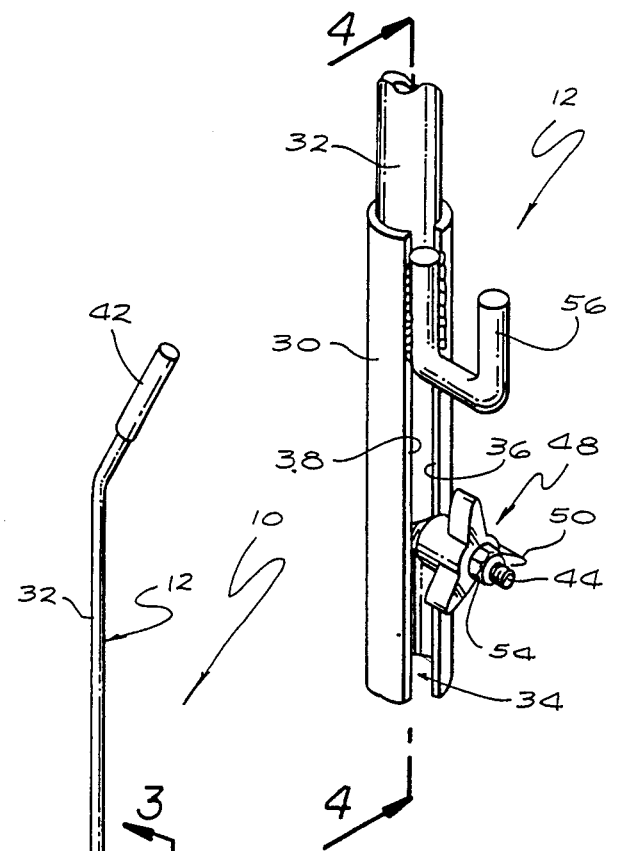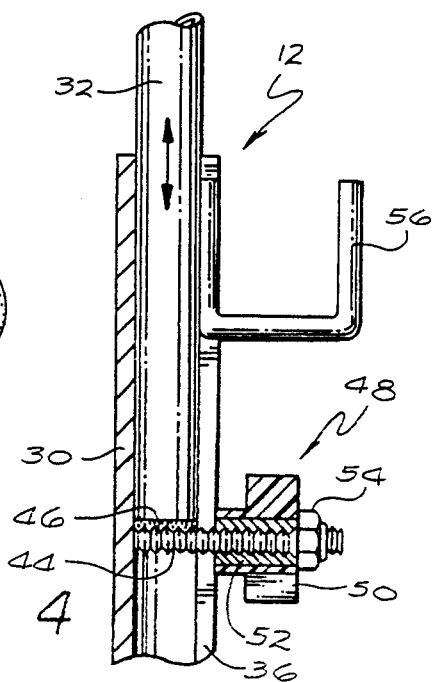

ADJUSTABLE CYLINDER TRANSPORT CART

BACKGROUND OF THE INVENTION

This invention relates generally to hand trucks and/or transport carts for moving and positioning pressurized cylinders such as oxygen bottles, and, more specifically, to such cylinder transport carts having a handle portion which can be adjustably extended or retracted.

In machine shops and factories, hand trucks and transport carts are utilized in moving oxygen and oxyacetylene bottles or tanks to locations where welding operations are transpiring. Further, such trucks or carts are used extensively in handling such bottles during transportation or filled bottles from a source to a customer, and of empty bottles from the customer back to the source for refilling. Additionally, cylinder transport carts are often used in hospitals, institutions, and homes, as well as at athletic events, where emergency portable oxygen units are required.

While cylinder transport carts must always be of sturdy and durable construction, it is desirable in many instances that they be collapsible to a degree. In this regard, users of trucks or carts for moving and positioning pressurized cylinders have shown interest in models where the handle or body portion can be collapsed when desired.

Accordingly, there has been a need for cylinder transport carts having a handle portion which can be adjustably extended or retracted in a safe and convenient manner, without adversely affecting the durability or reliability of the product. Such adjustable cylinder transport carts should be constructed in a manner which prevents any inadvertent separation of the adjustable handle or arm portion from the remainder of the cart of body. Further, an adjustable cylinder transport cart is needed which is aesthetically appealing and which is of economical construction. Moreover, a novel adjustable cylinder transport cart is needed which shields portions of the cart itself moved during the adjustment process, as by providing a telescoping-type handle. The present invention fulfills these needs and provides other related advantages.

SUMMARY OF THE INVENTION

The present invention resides in an improved cylinder transport cart which has an adjustable handle or body, is of simplified construction and therefore economical to produce, and yet is sufficiently sturdy and durable to withstand the rigors and abuse to which such carts are normally subjected. The adjustable cylinder transport cart comprises a telescoping body, means for holding the portions of the body which move relative to one another in a fixed spacial relationship, means for holding a pressurized cylinder or the like in a fixed spacial relationship with respect to the body, and wheel means for supporting and moving the body over a ground surface.

In a preferred form of the invention, the body includes a vertically oriented tube having an upper end and a lower end. This tube is constructed with a rearwardly facing open channel defined by two spaced-apart parallel edges. A lower end of an arm is slidably positioned within the tube in a manner permitting an arm handle portion to extend upwardly from the tube. A threaded shaft is affixed to the lower end of the arm and extends perpendicular to the longitudinal axis of the tube and outwardly through the channel. As the arm is moved within and relative to the tube, the shaft is caused to move the length of the channel.

The means for holding the portions of the body comprises a nut which is rotated upon the threaded shaft. This nut can be tightened to frictionally bear upon the tube, and thus hold the arm and tube in the desired fixed spacial relationship.

Stop means are provided for preventing passage of the shaft beyond the upper and lower ends of the tube. The stop means includes a hook attached to the tube at its upper end in a manner bridging the channel. The hook is welded in place to prevent withdrawal of the lower end of the arm from the tube when the arm is moved upwardly with respect to the tube. At the lower end of the tube, a horizontally oriented axle is attached thereto in a like manner to bridge the channel. This has the effect of forming a lower shaft stop over the channel.

The means for holding the pressurized cylinder includes an upper cylinder retaining band affixed to the tube opposite the channel, and a lower cylinder retaining band affixed to the tube in the same manner and directly below the upper cylinder retaining band. The upper cylinder retaining band is provided a carrying handle and a cylinder locking bolt.

The wheel means includes at least two wheels rotatably mounted to the axle. Further, a pair of supporting legs can be affixed to the lower end of the tube to extend therefrom beneath the lower cylinder retaining band in a manner providing support for the bottom end of the cylinder or the like. These supporting legs also provide additional points of ground contact which, in connection with the wheels, hold the cylinder or the like in an upright configuration when unattended.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a preferred form of the adjustable cylinder transport cart of the present invention, shown with an arm portion extended with respect to a tube portion, and further illustrating an exemplary pressurized cylinder held by the cart (in phantom);

FIG. 2 is another perspective view of the adjustable cylinder transport cart illustrated in FIG. 1;

FIG. 3 is an enlarged, fragmented perspective view of a portion of the body of the adjustable cylinder transport cart, taken generally along the line 3—3 of FIG. 2; and FIG. 4 is an enlarged, fragmented and partially sectional view taken generally along the line 4—4 of FIG. 3.

DETAILED DESCRIPTION OF THE PREFERRED EMBODIMENT

As shown in the drawings for purposes of illustration, the present invention is concerned with a novel adjustable cylinder transport cart, generally designated in the accompanying drawings by the reference number 10. This cylinder transport cart comprises a generally vertically oriented body 12, a pair of retaining bands 14 and 16 for holding a pressurized cylinder 18 in a fixed spacial relationship with respect the body, and a pair of wheels 20 and 22 which facilitate movement of the cylinder over a ground surface. The exemplary pressurized cylinder 18 is of the standard variety, and includes a bottle portion 24, a regulator 26 and gauges 28.

In accordance with the present invention, and as illustrated in FIGS. 1 through 4, the body 12 includes a lower tube portion 30 and an upper arm portion 32 partially situated within and slidable with respect to the tube portion. The tube portion 30 includes an open channel 34 defined by two spaced-apart parallel edges 36 and 38 extending substantially the length of the tube portion.

The upper end of the arm portion 32 is bent rearwardly to form a handle 40 which can be grasped when moving the cart 10 from one location to another. A non-slip handgrip 42 is provided over the upper end of the handle 40 to provide a convenient gripping surface. A threaded shaft 44 is affixed to the lower end of the arm portion, such as by a weld 46, in a manner causing the shaft 44 to extend generally perpendicular to the longitudinal axis of the body 12 outwardly through the channel 34. This arrangement insures that the general orientation of the arm portion 32 with respect to the tube portion 30 remains constant, and further provides means for holding the tube portion and the arm portion in a fixed spacial relationship, as desired.

In this regard, a thumbscrew 48, having an outer thumbscrew handle 50 and an inner threaded nut 52, is threaded onto the outwardly projecting portion of the threaded shaft 44. The thumbscrew 48 can be rotated with respect to the threaded shaft 44 to cause the nut 52 to frictionally bear upon the adjacent part of the tube portion 30, and prevent movement of the arm portion 32 relative to the tube portion. Further, a lock nut 54 can also be threaded onto the shaft 44 to effectively lock the thumbscrew 48, and thus the arm portion 32 with respect to the tube portion 30, in a desired location.

In order to prevent the arm portion 32 from being removed from the tube portion 30 when drawn upwardly therethrough, a mask hook 56 is attached to the tube portion at its upper end in a manner forming an upper shaft stop over the channel 34. More particularly, the hook 56 is placed in a position bridging an upper portion of the channel 34, and is welded to adjacent parts of the edges 36 and 38. When so placed, the threaded shaft 44 attached to the bottom end of the arm portion 32 is prevented from exiting the channel 34 through its upper end.

An axle 58 is attached, as by welding, near the lower end of the tube portion 30. It is preferred that the axle be positioned to bridge the lower end of the channel 34 to form a lower shaft stop which prevents passage of the shaft 44 beyond the lower end of the tube portion 30. The wheels 20 and 22 are rotatably mounted upon the ends of the axle 58 through suitable anti-friction bearings and retained by suitable conventional retainer means from escaping the ends of the axle (such bearing and retainer means being well known in the art).

The upper and lower cylinder retaining bands 14 and 16 are each hexagonal in shape, are generally vertically aligned with one another, and are affixed to the tube portion 30, as by welding, generally opposite the channel 34. The upper cylinder retaining band 14 has a carrying handle 60 attached thereto which facilitates lifting of the cart 10. Further, a cylinder locking bolt 62 extends through a side of the upper retaining band 14. This bolt 62 can be threaded through the upper retaining band 14 to wedge the pressurized cylinder 18 between the bolt 62 and the remainder of the retaining band.

To provide a support for the bottom of the pressurized cylinder 18 when held within the retaining bands 14 and 16, and further to provide, in connection with the wheels 20 and 22, a suitable platform for holding the body 12, and thus the pressurized cylinder 18, in an upright configuration, a pair of supporting legs 64 and 66 are fixed to the lower end of the tube portion 30 below the axle 58. Each of these supporting legs 64 and 66 include a horizontally oriented cylinder supporting portion 68 which extends below the lower retaining band 16. These cylinder supporting portions 68 are, in turn, attached to downwardly extending floor engaging portions 70 which, through a vinyl floor cap 72, provide two additional ground surface points of contact in addition to the wheels 20 and 22.

In use, the pressurized cylinder 18 can be easily and conveniently placed within or removed from the cart 10 by simply lifting or lowering the cylinder through the retaining bands 14 and 16. When initially placing a cylinder 18 onto the cart 10, it is advisable to withdraw the bolt 62 as far as possible so as to avoid damage to the bolt or the cylinder as the cylinder is lowered through the upper retaining band 14. Once the cylinder 18 has been placed within both retaining bands 14 and 16 so that its bottom end rests on the cylinder supporting portions 68 of the supporting legs 64 and 66, the bolt 62 can then be tightened to securely fix the pressurized cylinder 18 to the cart 10.

To transport the cylinder 18, an operator would simply grasp the hand grip 42 and pull the body 12 rearwardly so substantially all of the weight of the cart 10 and the cylinder 18 is supported by the wheels 20 and 22. The cylinder can then be moved conveniently to a desired location. It should be apparent that after the cart 10 and cylinder have been moved to a desired location, the operator can simply tilt the body 12 forwardly to place the floor engaging portions 70 of the supporting legs 64 and 66 in contact with the ground surface, which will, in connection with the wheels 20 and 22, hold the cylinder 18 in an upright configuration.

As explained previously, it is sometimes desirable to adjust the length of the body 12. This can be accomplished quickly and easily by simply loosening the lock nut 54, and then disengaging the thumbscrew 48 from the tube portion 30. The arm portion 32 can then be telescoped within the tube portion 30 as desired, and then subsequently fixed in the desired spacial relationship by retightening the thumbscrew 48.

From the foregoing it is to be appreciated that the adjustable cylinder transport cart 10 of the present invention provides a handle which can be adjustably extended or retracted in a safe and convenient manner, without adversely affecting the durability of reliability of the product. Further, the cart 10 of the present invention is aesthetically appealing and of economical construction. Moreover, it should be apparent that the manner in which the axle 58 and the mask hook 56 are attached to the tube portion 30 over the channel 34 prevents any inadvertent separation of the arm portion 32 from the remainder of the body 12.

Although a particular embodiment of the invention has been described in detail for purposes of illustration, various modifications may be made without departing from the spirit and scope of the invention. Accordingly, the invention is not to be limited, except as by the appended claims.

I claim:

1. A cart for transporting pressurized cylinders or the like, comprising:
 a generally vertically oriented tube having an upper end and a lower end, which tube includes a rearwardly facing open channel, the channel being defined by two spaced-apart parallel edges;
 an arm having a lower end slidably positioned within the tube, a handle portion extending upwardly therefrom, and a shaft affixed to the arm lower end and extending generally perpendicular to the longitudinal axis of the tube and outwardly through the channel;
 means for engaging the shaft in manner holding the tube and the arm in a fixed spacial relationship;
 a hook attached to the tube at its upper end in a manner forming an upper shaft stop over the channel which prevents withdrawal of the arm lower end from the tube when the arm lower end is moved upwardly with respect to the tube upper end;
 a generally horizontally oriented axle attached to the tube at its lower end in a manner forming a lower shaft stop over the channel which prevents passage of the shaft beyond the lower end of the tube;
 at least two wheels rotatably mounted to the axle;
 an upper cylinder retaining band affixed to the tube generally opposite the channel;
 a lower cylinder retaining band affixed to the tube generally opposite the channel and below the upper cylinder retaining band; and
 a pair of supporting legs affixed to the lower end of the tube and extending therefrom beneath the lower cylinder retaining band in a manner providing support for a bottom end of a cylinder or the like being held within the cylinder retaining bands.

2. A cart as set forth in claim 1, wherein the upper cylinder retaining band includes a carrying handle and a cylinder locking bolt for securely positioning a cylinder or the like therein.

3. A cart as set forth in claim 1, wherein the shaft is exteriorly threaded and the shaft engaging means includes an interiorly threaded nut which can be rotated with respect to the shaft to frictionally bear upon the tube for holding the arm and tube in a fixed spacial relationship.

4. A cart for transporting pressurized cylinders or the like, comprising:
 a vertically oriented body having a lower tube portion and an upper arm portion partially situated within and slidable with respect to the tube portion, wherein the tube portion includes an open channel defined by two spaced-apart parallel edges extending substantially the length of the tube portion, and wherein a shaft is affixed to a lower end of the arm portion, which shaft extends perpendicular to the longitudinal axis of the body and outwardly through the channel;
 means for engaging the shaft in a manner holding the tube portion and the arm portion in a fixed spacial relationship;
 means for holding the pressurized cylinder or the like in a fixed spacial relationship with respect to the body; and
 wheel means for supporting and moving the body over a ground surface.

5. A cart as set forth in claim 4, wherein the shaft is exteriorly threaded and the shaft engaging means includes an interiorly threaded nut which can be rotated with respect to the shaft to frictionally bear upon the tube portion.

6. A cart as set forth in claim 4, including means for preventing passage of the shaft beyond the upper and lower ends of the tube portion.

7. A cart as set forth in claim 6, wherein the stop means includes a hook attached to the tube portion at its upper end in a manner bridging the channel, and a horizontally oriented axle attached to the tube portion at its lower end over the channel.

8. A cart as set forth in claim 4, wherein the wheel means includes a horizontally oriented axle attached to the tube at its lower end, and at least two wheels rotatably mounted to the axle.

9. A cart as set forth in claim 4, wherein the pressurized cylinder holding means includes an upper cylinder retaining band affixed to the tube portion opposite the channel, and a lower cylinder retaining band affixed to the tube portion opposite the channel and beneath the upper cylinder retaining band.

10. A cart as set forth in claim 9, including a supporting leg fixed to the lower end of the tube portion and extending therefrom beneath the lower cylinder retaining band in a manner providing support for a bottom end of a cylinder or the like positioned within the pressurized cylinder holding means.

11. A cart as set forth in claim 4, wherein the pressurized cylinder holding means includes a carrying handle and a cylinder locking bolt for securely positioning a cylinder or the like therein.

* * * * *